(12) United States Patent
Eperiesi-Beck

(10) Patent No.: US 10,764,089 B2
(45) Date of Patent: Sep. 1, 2020

(54) GATEWAY COMPUTER SYSTEM WITH INTERMEDIATE DATA PROCESSING ACCORDING TO RULES THAT ARE SPECIFIED BY TEMPLATES

(71) Applicant: eperi GmbH, Pfungstadt (DE)

(72) Inventor: Elmar Eperiesi-Beck, Darmstadt (DE)

(73) Assignee: eperi GmbH, Pfungstadt (DE)

( * ) Notice: Subject to any disclaimer, the term of this patent is extended or adjusted under 35 U.S.C. 154(b) by 52 days.

(21) Appl. No.: 16/116,625

(22) Filed: Aug. 29, 2018

(65) Prior Publication Data
US 2019/0068406 A1  Feb. 28, 2019

(30) Foreign Application Priority Data

| Aug. 29, 2017 | (EP) | ................................... 17188449 |
| Oct. 5, 2017 | (EP) | ................................... 17195064 |
| Jun. 28, 2018 | (EP) | ................................... 18180605 |

(51) Int. Cl.
*H04L 12/66* (2006.01)
*H04L 29/06* (2006.01)
(Continued)

(52) U.S. Cl.
CPC ............ *H04L 12/66* (2013.01); *H04L 43/028* (2013.01); *H04L 43/04* (2013.01); *H04L 63/20* (2013.01);
(Continued)

(58) Field of Classification Search
CPC ....... H04L 12/66; H04L 43/028; H04L 43/04; H04L 63/20; H04L 67/2823; H04L 69/08;
(Continued)

(56) References Cited

U.S. PATENT DOCUMENTS

| 2006/0265689 A1* | 11/2006 | Kuznetsov | ............... G06F 9/546 |
| | | | 717/117 |
| 2009/0119416 A1* | 5/2009 | Sirdevan | ................. H04L 69/08 |
| | | | 709/246 |

(Continued)

FOREIGN PATENT DOCUMENTS

WO  2017161065 A1  9/2017

OTHER PUBLICATIONS

Extended European Search Report for EP Application No. 17195064.5, dated Nov. 22, 2017, 9 pages.
(Continued)

*Primary Examiner* — Ayaz R Sheikh
*Assistant Examiner* — Louis Samara
(74) *Attorney, Agent, or Firm* — Brake Hughes Bellermann LLP

(57) ABSTRACT

A computer-implemented method for communicating data between computer systems in the functions of a source computer system and of a target computer system is performed by a data modification engine in a gateway computer that is communicatively connected between the computer systems. The engine receives an original data package from the source computer system with elements that are arranged according to a pre-defined data-structure. The engine accesses a rule template that corresponds to the data-structure and that provides a plurality of pre-defined rules. The engine separates the original data package into elements, processes the elements by digitally transforming them according to the rules, combines them to a modified data package and sends the modified data package to the target computer system.

20 Claims, 10 Drawing Sheets

(51) Int. Cl.
*H04L 12/26* (2006.01)
*H04L 29/08* (2006.01)

(52) U.S. Cl.
CPC .......... *H04L 67/2823* (2013.01); *H04L 69/08* (2013.01); *H04L 69/22* (2013.01); *H04L 63/0421* (2013.01); *H04L 63/0428* (2013.01)

(58) Field of Classification Search
CPC ............. H04L 63/0421; H04L 63/0428; H04L 41/0893; H04L 41/06
See application file for complete search history.

(56) References Cited

U.S. PATENT DOCUMENTS

| | | | |
|---|---|---|---|
| 2013/0298221 A1* | 11/2013 | Smith | H04L 63/0414 726/13 |
| 2015/0324417 A1* | 11/2015 | Danielsson | G06F 16/93 707/694 |
| 2017/0116436 A1* | 4/2017 | Wu | G06F 16/252 |
| 2017/0201375 A1* | 7/2017 | Amin | H04L 63/08 |
| 2018/0109498 A1* | 4/2018 | Singh | H04L 63/101 |

OTHER PUBLICATIONS

Extended European Search Report for EP Application No. 18180605.1, dated Aug. 27, 2018, 9 pages.

\* cited by examiner

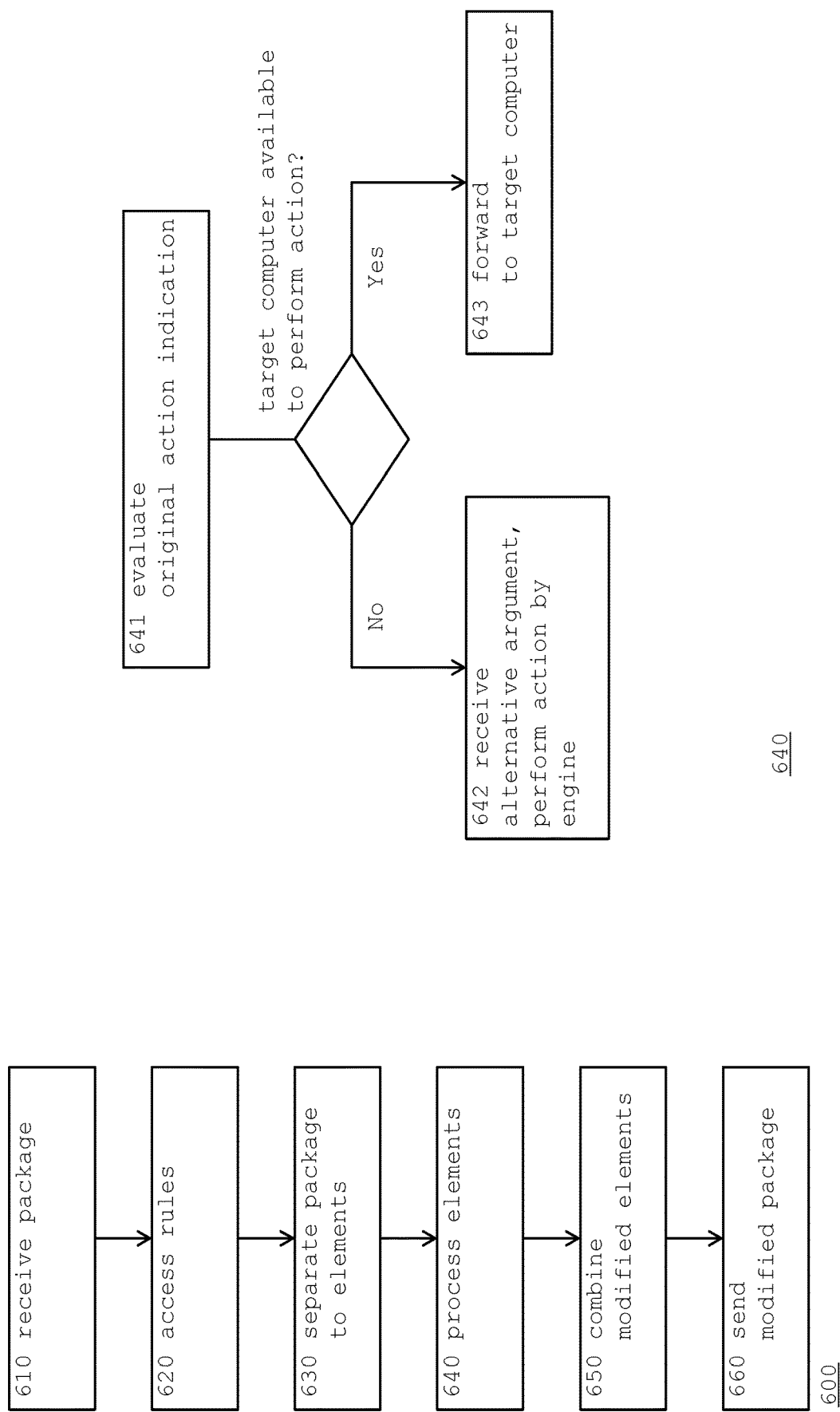

GATEWAY COMPUTER SYSTEM WITH INTERMEDIATE DATA PROCESSING ACCORDING TO RULES THAT ARE SPECIFIED BY TEMPLATES

CROSS REFERENCE TO RELATED APPLICATIONS

This application claims priority under 35 U.S.C. § 119 to European Patent Application EP 17188449, filed Aug. 29, 2017, titled "Gateway Computer System With Intermediate Data Processing According To Rules That Are Specified By Templates," to European Patent Application EP 17195064, filed Oct. 5, 2017, titled "Gateway Computer System With Intermediate Data Processing According to Rules That Are Specified By Templates," and to European Patent Application EP 18180605, filed Jun. 28, 2018, titled "Communicating Data Between Computers By Harmonizing Data Type," all of which are incorporated herein by reference in their entirety.

The description in general relates to the communication between computer systems, or more in particular, to a gateway computer system, to a computer-implemented method and to a computer program to process data according to template-specified rules.

BACKGROUND

Computers communicate with each other through communication channels, such as through channels that are implemented by networks. Much simplified, a source computer (or "sender") sends data to a target computer (or "receiver"). Source and target computers are roles or functional descriptors to indicate the direction of communication. Usually, the communication is bidirectional: a particular computer can act as a source computer and act as target computer at the same time.

Taking separation of concerns into account, the computers communicate because the computers perform distributed computing with specialized functions. According to the functions, the computers are configured differently. For example, a first computer executes a first application (such as a browser application to interact with a user), and a second computer performs a second application (such as a database application to store and provide data for the user). Both computers act as source and as target. The first application causes the first computer (i.e., in the source role) to send data, the second application causes the second computer (i.e., in the target role) to receive the data. The second application causes the second computer (i.e., this time in the source role) to process the data and return processed data to the first computer (i.e. this time in the target role). Such or similar combinations of computers (and of applications) are frequently referred to a as "client/server arrangement".

The first computer and the second computer are often physically remote to each other. For example, while the first computers are located in rooms, in vehicles, or other places suitable for humans, the second computers are located in places such as server farms, computer data centres etc. In the art, the term "cloud computing" is frequently used to describe such approaches, usually in view of the second computers.

From a broader perspective, the second computers execute their applications with the goal to provide services to users of the first computers. Examples for such second applications are business applications, database applications, traffic information applications, document handling applications, etc. Frequently, the second applications are provided in so-called software-as-a-service (SaaS) scenarios.

With respect to the number of users and the number of computers, different scenarios can be distinguished, such as:

Many to one (asymmetrically). For example, there can be a plurality of first computers, most of them with single users: mobile devices (such as "smartphones"), personal computers (PC) etc. A second computer provides services to the plurality of users through the first computers. The applications running on the computers can be adapted accordingly: in the first computers (i.e. in plural), browser applications focus on user-computer interaction to communicate data to and from the user; in the second computer (i.e. in singular), the application processes the data. Simplified, data processing can comprise receiving data, modifying data, storing the modified data and sending the modified data.

One to One (symmetrical). For example, the first and second computers exchange data to provide redundancy.

Many to Many scenarios describe situations, for example, with multiple client computers and with multiple server computers, with the server computers having different functions (e.g., application, database) and various redundancy arrangements.

Letting computers communicate with each other in such or similar scenarios, dictates a number of requirements (and/or constraints), among them, simplified:

Security is required to prevent non-authorized access to the data, accidental interception of the communication, interception on malicious purpose, eavesdropping etc. Security measures are especially applicable to sensitive data (i.e. to data that is potentially of value for attackers, interceptors etc.). Hereby, the basic security concepts of confidentiality, integrity, availability and non-repudiation need to be achieved.

Scalability is required for computational resources, especially of the second computer(s) that store and process data, to provide services for a number of first computers, with the numbers of the first computers being variable.

Adaptability is required to accommodate changes, especially in the application running at the second computer(s). Adaptability is related to complexity.

The requirements can be conflicting with each other. To address some of the requirements, intermediate computers—such as gateway computers (or proxy computers)—participate in the communication by further processing data. In a typical scenario, an intermediate computer receives data from a first computer (acting as the source computer), pre-processes the data, and sends the pre-processed data to the second computer (acting as the target computer). In response, the intermediate computer receives data from the second computer (source), pre-processes the data as well and forwards the data to the first computer (target).

More in detail, gateways that participate in the communication can contribute to security, for example, by adding authentication and/or authorization, by encrypting and/or decrypting data, by scanning for malicious software (e.g., computer viruses, computer worms), by data leak prevention (DLP) measures etc.

scalability, for example, by caching data (i.e., preliminary storing) for re-use, re-routing, load-balancing, and adaptability, for example, in being adaptive themselves.

However, conflicts are possible: for example, a semi-adaptive gateway that starts to provide encryption/decryption (as a service to the communication between source and target) but that keeps plain data (i.e., non-encrypted data) in a cache would eventually cause undesired data-leakage or the like. Changes—such as the adaptation of security settings—are potentially applicable to all computers, not only to the first and second computers, but also for the intermediate computers (gateways). Further, the frequency of change can be different for each computer. Taking the asymmetric scenario ("many to one") as an example, the first computers (executing the browser applications) are less frequently in need for changes than the second computer (executing, for example, the SaaS application). Changes often relate to the structure of the data by that the computers communicate. The intermediate computers would have to accommodate the changes at the higher change frequency (i.e. that of the second computers).

Security, scalability, adaptability and other constrains (or requirements) influence each other so that the overall complexity increases. Further, intermediate computers are potentially in inter-communication between multiple second computers, executing different service applications (many to many). Changes further increase complexity. There is an overall technical problem to comply with the mentioned constraints or requirements without further increasing complexity.

SUMMARY

To solve this overall technical problem, an intermediate computer communicates data in a complexity-reduced approach that meets these constrains or requirements. According to embodiments of the present invention, the intermediate computer (hereinafter also called the "gateway" or the "gateway computer") communicates data between computer systems that perform the functions of a source computer system and of a target computer system.

The gateway uses a data modification engine ("engine" in short) that receives original data packages from the source computer system, that modifies the original data packages, and that sends modified data packages to the target computer system. The data packages are being modified by processing their elements separately, by digitally transforming at least some of the elements.

Data modifying (i.e. "pre-processing") is specific to the particular applications (of the first and second computers). The gateway remains responsive to changes of the applications (the first, the second, or both) without the need for being re-programmed. This is accomplished by keeping rules (that are updated at a relatively high frequency) apart from rule-executing instructions (that are updated at a relatively low frequency). The rules are stored in one or more rule templates that are accessible to the gateway computer.

The data modifications by the engine are explained according to an expected impact on the above-mentioned requirements/constraints (i.e., security, scalability, adaptability). In the following, the mapping from the data modifications to the constraints corresponds to the expected impact, but data modifications can address several constraints at the same time.

Security Constraint

Data modification can comprise encrypting data, and/or decrypting data. Data modification can also comprise to change data identifiers (e.g., introduce pseudonyms) to remove data identifiers (e.g., make identifiers anonym), applied at least partially so that individual data elements are difficult to be recognized (or even impossible to be recognized). Data modification can also comprise substituting sensitive data elements with non-sensitive data elements (so-called tokenizing data), and re-arranging a sequence of elements according to a pre-defined convention (such as by applying convolutional interleaving or similar techniques). Even the communication protocol can be changed. Security settings are provided accordingly: Security settings comprise, for example, the selection of encryption/decryption algorithms, of encryption/decryption keys, rules to change/remove data identifiers, rules to select and apply data tokenization etc. The security settings (and other settings) can be provided (and changed) by letting the gateway interact with an administrator user.

Scalability Constraint

Data modifications that reduce the variability of data conventions may be advantageous in "to many" scenarios. The engine can modify data by encoding (or re-encoding, transcoding) data according to specific character sets (i.e., transforming the code from one form into another form, such as a converting text characters from 8-bit ASCII-coding to 16-bit Unicode-coding). Normalizing data may comprise the conversion of measurement units (e.g., for the temperature, changing from degree Fahrenheit to degree Celsius) and checking for data for consistency (e.g., the gender of a person matching to his/her given name).

Adaptability Constraint

The engine can perform data modifications according to rules that comprise instructions in a computer language (such as JAVA, C++, .NET etc.). It is also possible to provide the rules in a mark-up language that is readable for both humans and machines, such as XML (Extensible Markup Language).

Data Modifications and additional actions (such as security relevant actions) can also be described and triggered with meta-languages. The meta-languages are, for example, Extensible Stylesheet Language Transformations (XSLT) or other. The engine can perform actions that are defined as workflows with meta-languages as well, such as for example, in BPEL (Business Process Execution Language).

The engine can modify the data by performing operations that are instructed for execution by the target computer. In such scenarios, the engine acts as an auxiliary target computer.

The engine can obtain the applicable rules from a variety of origins or sources: (i) Incoming (i.e. original) data packages (i.e. from the source) can be analysed. (ii) Rules can be received from the manufacturer of the application. Usually, this relates to the applications on the second computers. The engine can interact with the manufacturer through an API (application program interface) or otherwise. (iii) An analyser can—at regular intervals—interact with the applications (on the first and/or second computers) to identify changes or updates of the rules.

The engine can obtain the rules by monitoring the applications at regular time intervals (in a pull scenario, monitoring results lead to rules). The engine can apply meta-rules to change the rules automatically. Interaction with an administrator user is possible, for example, upon detecting a variation in the data-structure of the data packages.

The engine can add meta-data to a data package indicating that a modification was performed. When an application (at the target computer) or the engine receives the data package (or receives it again), the engine can reverse the modification (for the portion of the data that was indicated). Meta-data can be implemented by character conventions that are not used by the data.

A computer-implemented method relates to communicating data between computer systems in the functions of a source and target computer system. The method is performed by the engine in the gateway computer that is communicatively connected between the source computer system and the target computer system.

In a receiving step, the engine receives an original data package from the source computer system. The original data package has a plurality of elements that are arranged according to a pre-defined data-structure. In an accessing step, the engine accesses a rule template that is associated with the data-structure and that provides a plurality of pre-defined rules. In other words, there is a pre-defined correspondence between particular rule templates and particular data-structures. In a separating step, the engine separates the original data package into the plurality of elements according to the data-structure. In a processing step, the engine processes the elements by digitally transforming at least some of the elements according to the plurality of rules (at least a sub-set of elements in being transformed). This processing results in the processed elements. In a combining step, the engine combines the processed elements to a modified data package. The engine combines according to the data-structure. In a sending step, the engine sends the modified data package to the target computer system.

Concentrating adaptations by updates or other modifications to one point—to updates of the templates—can result in the technical effect that the data-structure of the data-packages remain unchanged (i.e., keeps the packages readable for the target computer).

While the gateway/engine modifies the data, the target computer that receives the data from the gateway/engine performs a variety of actions, such as storing data, searching and retrieving data, performing calculations etc. The term "indicator" stands for data that represents data to be processed. Indicators can be pointers or references or indicators can also be identical with the data to be processed. There are action indicators that represent an action, and there are argument indicators that represent an argument.

Concentrating the modifications to the gateway can be beneficial to the performance efficiency of the target computer: Some of the actions can be shifted from the target computer to the gateway computer. More in detail, in applying the processing step, the data modification engine can look up an original argument indicator (from the data package) in an index storage that is available to the data modification engine. The index storage provides a modified argument indicator as an index that allows the computer in the target function to access data that corresponds to the argument indicator. Such an approach can speed up processing and can save computation resources at the target computer, contributing to scalability. Also, data processing would be distributed between computers so that security can be enhanced as well.

In performing the processing step, the data modification engine—using instructions from the rule template—can evaluate the original action indicator in combination with the original argument indicator to determine availability or non-availability of the target computer system to perform a particular action (that is indicated in the original action indicator). Depending on the determination, the action is performed by the gateway/engine or by target computer. Such an approach allows, for example, shifting the performance according to the above-mentioned security, scalability, adaptability requirements. For example, security-critical encryption/decryption can be shifted to the gateway/engine; actions with relatively lower complexity and relatively lower update frequency (such as protocol converting) can be performed by the gateway, while actions with relatively higher complexity and relatively higher update frequency remain actions for the target computer.

From a different perspective, a gateway computer is communicatively connected between the source/target computer systems. The gateway computer comprises a data modification engine adapted to perform the computer-implemented method for communicating data.

Also from a further perspective, a data modification engine for use in a gateway computer is communicatively connected between the source/target computer systems. The engine is adapted to perform the computer-implemented method for communicating data.

A computer program product—when loaded into a memory of a computer and being executed by at least one processor of the computer—performs the steps of the computer-implemented method.

BRIEF DESCRIPTION OF THE DRAWINGS

FIGS. 6A and 6B illustrate method flow charts of a computer-implemented method for communicating data between computer systems.

DETAILED DESCRIPTION

Computer System

Figure 1:
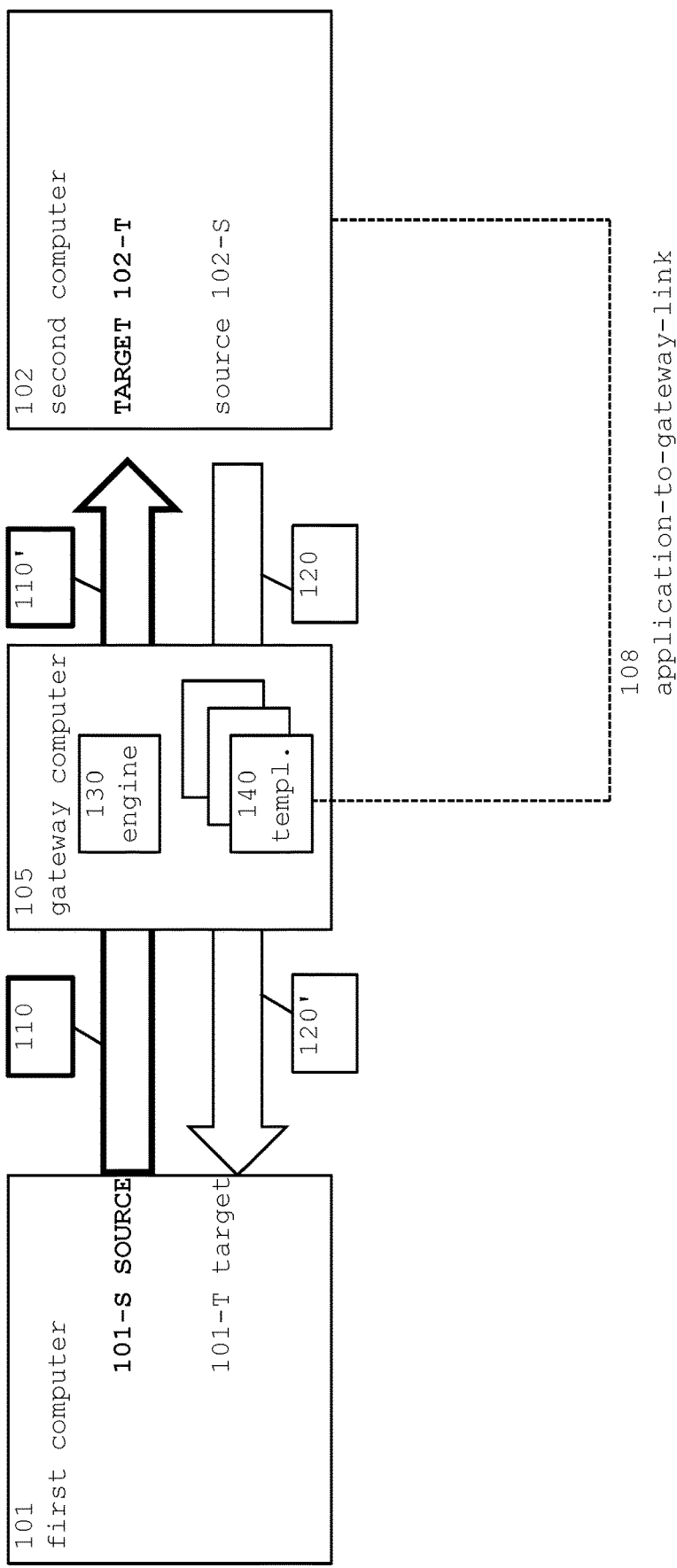
FIG. 1 illustrates a computer system with a first computer and a second computer that communicate by sending and receiving data packages via a gateway computer.

FIG. 1 illustrates a first computer system 101 and second computer system 102 (computers 101, 102 in the following) that communicate by sending and receiving data packages 110, 120 via gateway computer 105 (gateway 105 in the following).

Computers 101 and 102 have the functions of a source computer system 101-S, 102-S and of a target computer system 101-T, 102-T. Computer 101 (as source) sends original data package 110 to computer 102 (as target), and computer 102 (as source) sends original data package 120 to computer 101 (as target). Gateway 105 is an intermediate computer and receives original data packages 110, 120 from the computer acting as source and sends modified data packages 110', 120' to the computer acting as target. Gateway 105 comprises data modification engine 130. Gateway 105 modifies original data package 110 to modified data package 110', and modifies original data package 120 to modified data package 120'.

As illustrated herein, the left-to-right communication direction (from computer 101 to computer 102, illustrated bold) is an exemplary communication direction for data packages 110/110'. In the following, the description concentrates on explaining the modification of data packages 110. Persons of skill in the art can apply the teachings accordingly for data packages 120. For simplicity, FIG. 1 illustrates a single gateway computer, but implementations with two or more gateways are also contemplated: a first gateway would communicate data packages 110 from computer 101 to computer 102, and a second gateway would communicate data packages 120 from computer 102 to computer 101.

Rule templates 140 provide rules for the operation of engine 130, especially for modifying the data packages 110/120. The instructions for the operation of engine 130 is therefore stored in engine 130 itself (e.g., by a rule interpreter) but also in the rules. As illustrated by a dotted arrow 108, rule templates 140 can be provided—at least partially—from computer 102. Arrow 108 symbolizes a rule-provisioning function. The function can be implemented by a data-connection (application-to-gateway-link) so that rules and rule updates can be communicated from computer 102 (or from other origins) to gateway computer 105 as soon as they become available. Although the arrow is illustrated uni-directional (from computer 102 to gateway 105), a bi-directional approach can be implemented as well, for example to allow computer 102 to obtain an identification of rule templates that are installed at gateway 105. Additionally, other computers (that are not illustrated) may be able to modify and update rule templates 140. This can be advantageous in situations in that, for example, second computer 102 changes its processing. In other words, changes that are dictated by computer 102 can be reflected by rule templates 140 as well. Further details are explained in connection with FIG. 5.

Although rule templates 140 are illustrated as being part of gateway 105, the rule templates can be stored outside the gateway as long as the gateway has access to the templates. The illustration of FIG. 1 concentrates on the logical arrangement of the computers, but the person of skill in the art can physically locate gateway computer 105 according to the physical location of computers 101 and 102. Gateway computer 105 can be co-located with, for example, computer 102. Further, gateway computer 105 and second computer 102 can be located within the same demilitarized zone (DMZ). Still further, gateway 105 (and engine 130) can be divided into multiple parts and can be located on several IT systems (e.g., multiple gateway computers 105, multiple first computers 101, or multiple second computers 102.)

To explain examples, description and drawings will reference templates by reference "140" in combination with the FIG. 1D.

Data Package or Data Packets

Figure 2A:
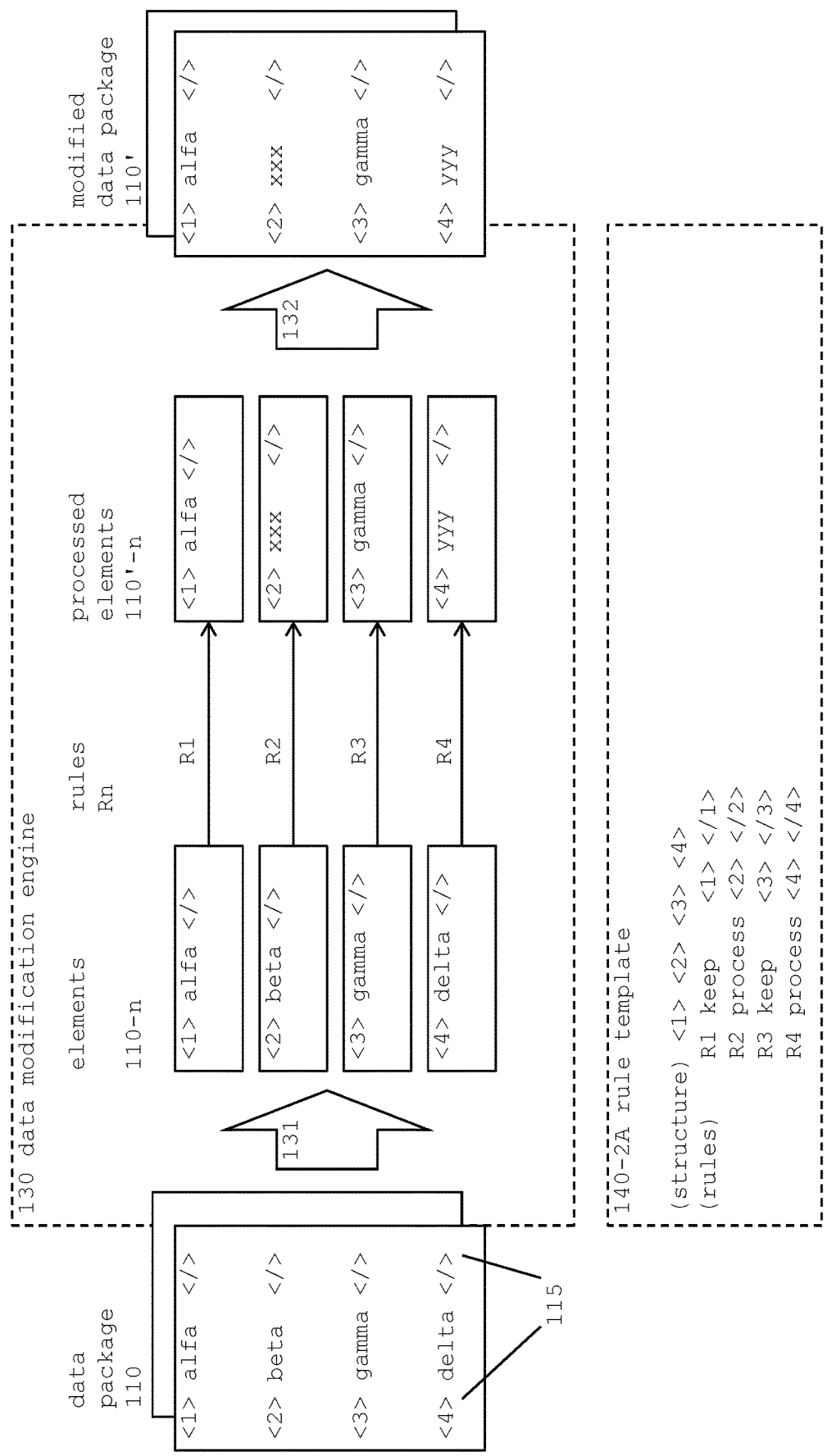
FIGS. 2A and 2B illustrates a data package that is communicated from the first computer to the second computer, in combination with a data modification engine that is part of the gateway computer and that modifies the data package by processing at least some of its elements.
Figure 2B:
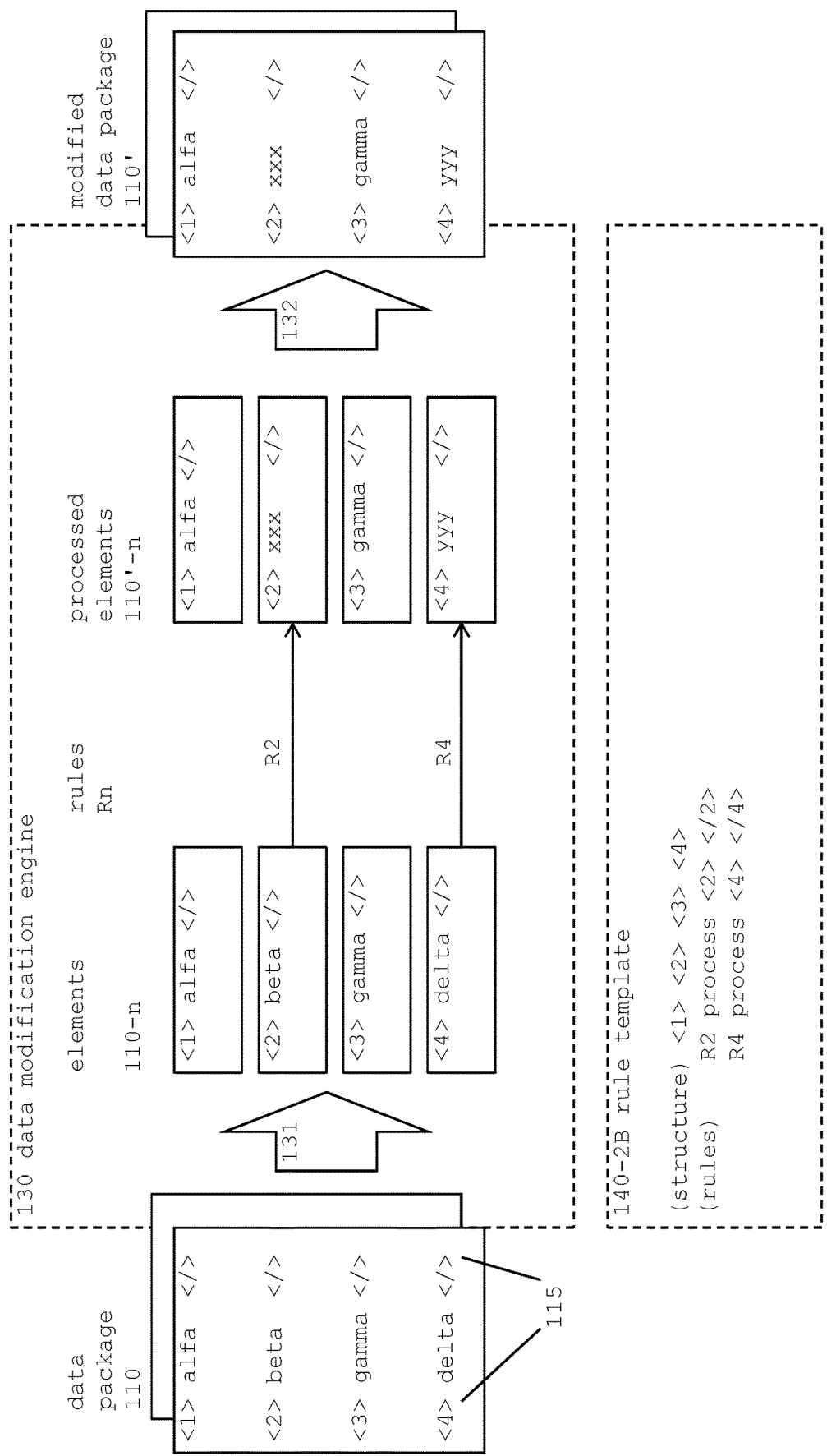

FIGS. 2A and 2B illustrates data package 110/110' that is communicated from computer 101 to computer 102, in combination with data modification engine 130 (that is part of the gateway computer as in FIG. 1 and that modifies original data package 110 by processing at least some of its elements 110-n.) Engine 130 processes the elements 110-n by digitally transforming them according to a plurality of rules to processed elements 110'-n.

Data packages 110/110' are illustrated by overlapping rectangles to symbolize that (i) the gateway communicates pluralities of packages (e.g., packages in sequences) and that (ii) data packages can be different from each other (in terms of structure and content). For simplicity, the description concentrates on a single package.

Original data package 110 is illustrated as the input of engine 130 (in the figures on the left side). Original data package 110 has a plurality of N original elements 110-n that are arranged according to pre-defined data-structure 115. Using the concept of a "data-structure" is convenient for explanation, but it is noted that data-structure 115 is not necessarily a component of a data package, although structural elements (such as tags) can be part of the data package.

Data-structure 115 has at least two purposes:
a) to identify the borders or limits of original data package 110 (in the figures illustrated by a box) so that particular pieces of information communicated between the computers can be assigned to one particular data package.
b) to identify individual non-overlapping portions (i.e. elements) within the original data package.

In the example, original data package 110 uses structural tags (to open < >, to close </>) that number the elements from 1 to 4. The opening tag <1> of the first element and the closing tag </4> of the last/fourth element indicate the borders. In the example, original data package 110 could be written as <1> . . . </1><2> . . . </2><3> . . . </3><4> . . . </4>, with ellipses " . . . " being placeholders for content. For convenience, the figures illustrate the packages with line breaks, but in practical implementations these breaks are not required.

The example is simplified, original data package 110 could be structured otherwise, for example using one or more of the following:
a file having individual elements separated by lines or symbols (e.g., end of line symbols; comma, colon, semicolon, etc.),
a file having a pre-defined start convention to identify format or protocol, sometimes called "file signature" or "magic number" (e.g., "% PDF" for electronic documents in Portable Document Format (PDF)),
a file having a pre-defined end convention,
a payload in an TCP/IP package (or combinations of packages),
a command to a database with action and argument (e.g., "save X"),
an operating system command (e.g., "dir *.txt"),
an instruction to trigger a transaction in a business application,
a structure with portions having a fixed length (e.g., "AAABBBCCC" being a structure with 3 portions having fixed length "3", "AABBBB" being a structure with 2 portions having the lengths "2" and "4"),
structure with manufacturer or vendor specific protocols, like Messaging Application Programming Interface (MAPI), Exchange Web Services (EWS), protocols used by software-as-a-service providers such as SALESFORCE or SERVICE NOW,
protocols like asynchronous JavaScript and XML (AJAX), JavaScript Object Notation (JSON) (other conventions are possible as well),
data interchange or transfer protocols like Internet Message Access Protocol (IMAP), Simple Mail Transfer Protocol (SMTP), Electronic Banking Internet Communication Standard (EBICS).

In the example (that is simplified for illustration), original data package 110 comprises the following exemplary content: "alfa" in original element 110-1, "beta" in original element 110-2, "gamma" in original element 110-3, and "delta" in original element 110-4. Modified data package 110' comprises the following exemplary content: "alfa" in processed element 110'-1, "xxx" in processed element 110'-2, "gamma" in processed element 110'-3, and "yyy" in processed element 110-4. Processing can be "non-processing" (or "zero-processing"), in the example, 110-1/110'-1 and 110-3/110'-3 remain unchanged. But there are still rules R1, R3 that indicate non-processing. In the example of FIG. 2A, these rules are given explicitly ("keep"). The rules in the figures are simplified. The person of skill in the art can provide rules that are more complex.

Modified data package 110' (illustrated at the output of engine 130) can have the same data-structure 115 as (unmodified) data package 110. This may have a number of advantages: there is no need to modify data processing at the target computer (i.e., at computer 102-T, 101-T). In other words, modifying data packages can be limited to modifying content, but keeping the data-structure unchanged.

It is however possible to modify data packages such that the data-structure changes as well.

Templates

Figure 4A:
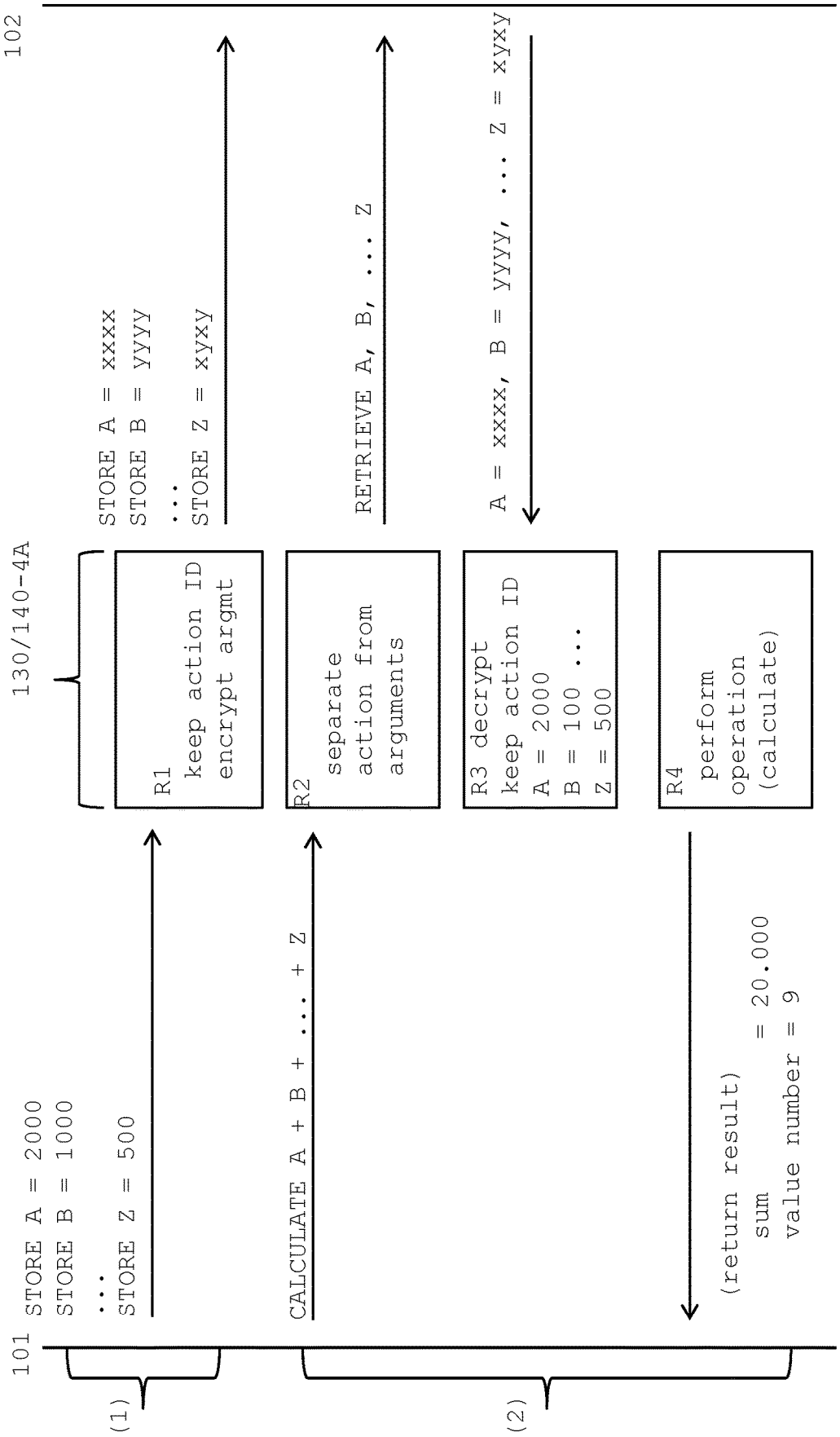
FIGS. 4A and 4B illustrate a simplified usage scenario with exemplary activities of the first computer, the engine, and the second computer.
Figure 4B:
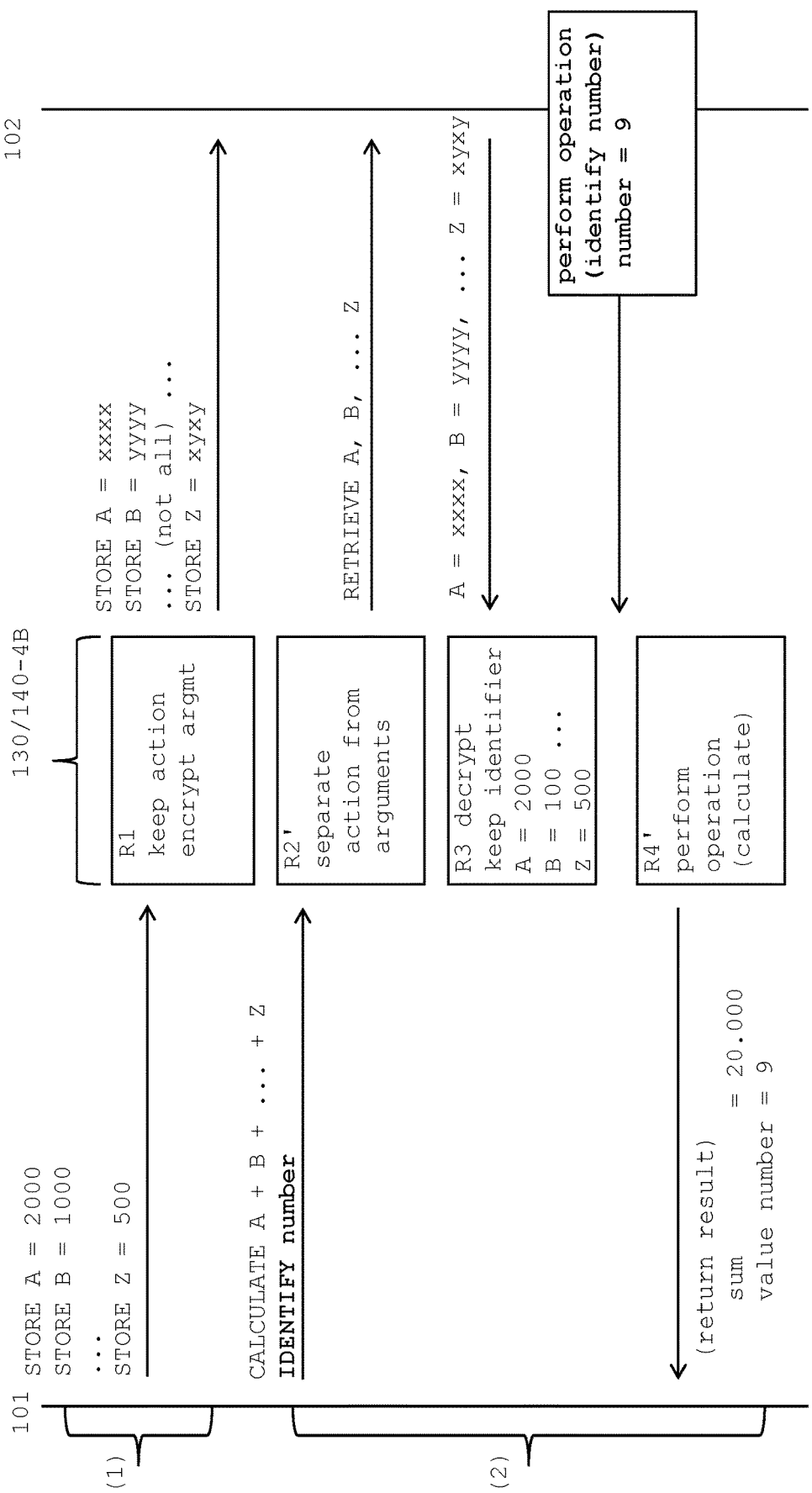

Rule templates 140-2A, 140-2B describe workflows and data modifications based on data-structure 115 (<1> . . . </1><2> . . . </2><3> . . . </3><4> . . . </4>). Persons of skill in the art know how to identify the data-structure of a data package, so that at least some of the data packages (that gateway 105 receives) have a matching rule template. Engine 130 accesses a rule template that is associated with data-structure 115 (or data package 110) by identifying a particular data-structure and by selecting a particular template. In other words, there is a correspondence between template and data-structure. The person of skill in the art can implement a mapping (from identification to selection) without the need of further explanation herein. The example of FIGS. 4A and 4B illustrates templates 140-2A, 140-2B that are particular templates to the particular data-structure (<1> . . . </1><2> . . . </2><3> . . . </3><4> . . . </4>). Hence the rules in the particular templates are applicable.

Practical implementations will use a plurality of rule templates, but it is noted that not every data-structure requires a rule template. Engine 130 can implement a general rule to forward a data package without modifying it if there is no matching template. Therefore, it is not necessary to provide templates for all data-structures.

Since the data-structure is associated with the data package (so that the engine knows the structure), gateway 105 can separate the data package 110 into its elements 110-n. This is illustrated by separator component 131 (that is part of gateway 105, and that can be implemented as part of engine 130).

The rule template also provides representations of operations (i.e. rules) that specify the operation of the engine (to be performed for packages that have corresponding data-structures).

Gateway 105 modifies data package 110 by processing at least some of its elements 110-n. The description distinguishes the terms "modify" and "process" for simplicity of explanation, according to the granularity. But both terms stand for data processing.

In the example, template 140-2A provides processing rules R1 for element 110-1, R2 for element 110-2, R3 for element 110-3, R4 for element 110-4. In other words, the rules are element-specific. In the example, R1 indicates to keep the content between <1> and </1>, R2 indicates to process the content between <2> and </2>, R3 indicates to keep the content between <3> and </3>, and R4 indicates to process the content between <4> and </4>.

Having a rule for each element is convenient for explanation, but not necessary. A particular rule can be applicable to more than one element.

Processing in general can be specified (in the same template, or otherwise) in particular to encrypting. Looking at the content, some of the elements remain plain, some of the elements are encrypted to cipher-format. For example, "alfa" remains "alfa", "beta" becomes "xxx", "gamma" remains "gamma", and "delta" becomes "yyy".

Since a data-structure is associated with the data package, gateway 105 can combine the processed elements 110'-n (processed elements, un-processed elements) to modified data package 110'. This is illustrated by combiner component 132. In the example, modified data package 110' would be <1>alfa</1><2>xxx</2><3>gamma</3><4>yyy</4>.

FIG. 2A illustrates a version in that rule template 140 indicates processing for each elements, even if an element remains unprocessed. FIG. 2B illustrates a version in that rule template 140-2B indicates only the rules for elements to be processed. Engine 130 implicitly includes rules to keep elements (without associated rules) unchanged. In other words, non-processing rules are provided implicitly. Such an approach for "modify-rules only" can save memory (for storing the template).

Processing Elements According to Constraints

Looking at processing elements, the rules can correspond to the above mentioned requirements/constraints. As in the example of FIGS. 2A and 2B, rules can be applicable to sub-sets. The description will give some further examples for rules. Giving requirements/constraints in parenthesis is convenience for illustration but not limiting. Technical measures can be responsive to multiple requirements/constraints (security) Reciprocal rules can be applied for decrypting data. To stay with the example, the template can have rules that cause the engine, for example, to decrypt elements 110-2 and 110-4. (The usage of the "120" references would also be applicable, in reverse direction for data packages from computer 102 to computer 101, cf. FIG. 1).

(security) Data identifiers can be changed as well, by removing or by modifying them. Supposing, element 110-1 is an identifier for a particular data set (e.g., the name of a particular person as being sensitive). Original element 110-1 can be removed if processing by computer 102 does not require it (making the data anonym), element 110-1 can be modified if computer 102 still need a data ID (making the data pseudonym, e.g., from "Alice" to "Bob"). It is understood that changing an element does not change the data-structure, so that processing the (modified) data package at the target computer does not have to be modified as well. In the example, only "alpha" would be removed or changed, but the structural tags <1></1> would remain.

(security) In a different situation—with a single rule for all elements—a rule lets engine 130 arrange content in a particular order (tokenization and/or interleaving, resulting, e.g. in <1>gamma</1><2>alfa</2><3>delta</3><4>beta</4>). The data-structure remains unchanged.

(scalability) It is noted that in practical implementations, there are large numbers (1.000 s, 10.000 s, etc.) of data packages. Rules can, for example, normalize measurement units. <1>temperature</1><2>Pfungstadt</2><3>24 Aug. 2017</3><4>20° C.</4> would remain, but <1>temperature</1><2>New York</2><3>24 Aug. 2017</3><4>90° F.</4> would be modified to a data package with a ° C. number.

(adaptability) Rules for converting communication protocols can assist in normalizing the communication of data packages between the computers. For example, encrypting and decrypting rules can be based on the following protocol: HyperText Transfer Protocol Secure (HTTPS), but a rule-based protocol conversion can change the protocol to HTTP, or vice versa. Such protocol normalization scenarios can be advantageous in situations with multiple computers 101 (cf. "many to one"). Such measures can reduce complexity.

Action and Argument in the Data Packages

Figure 3:
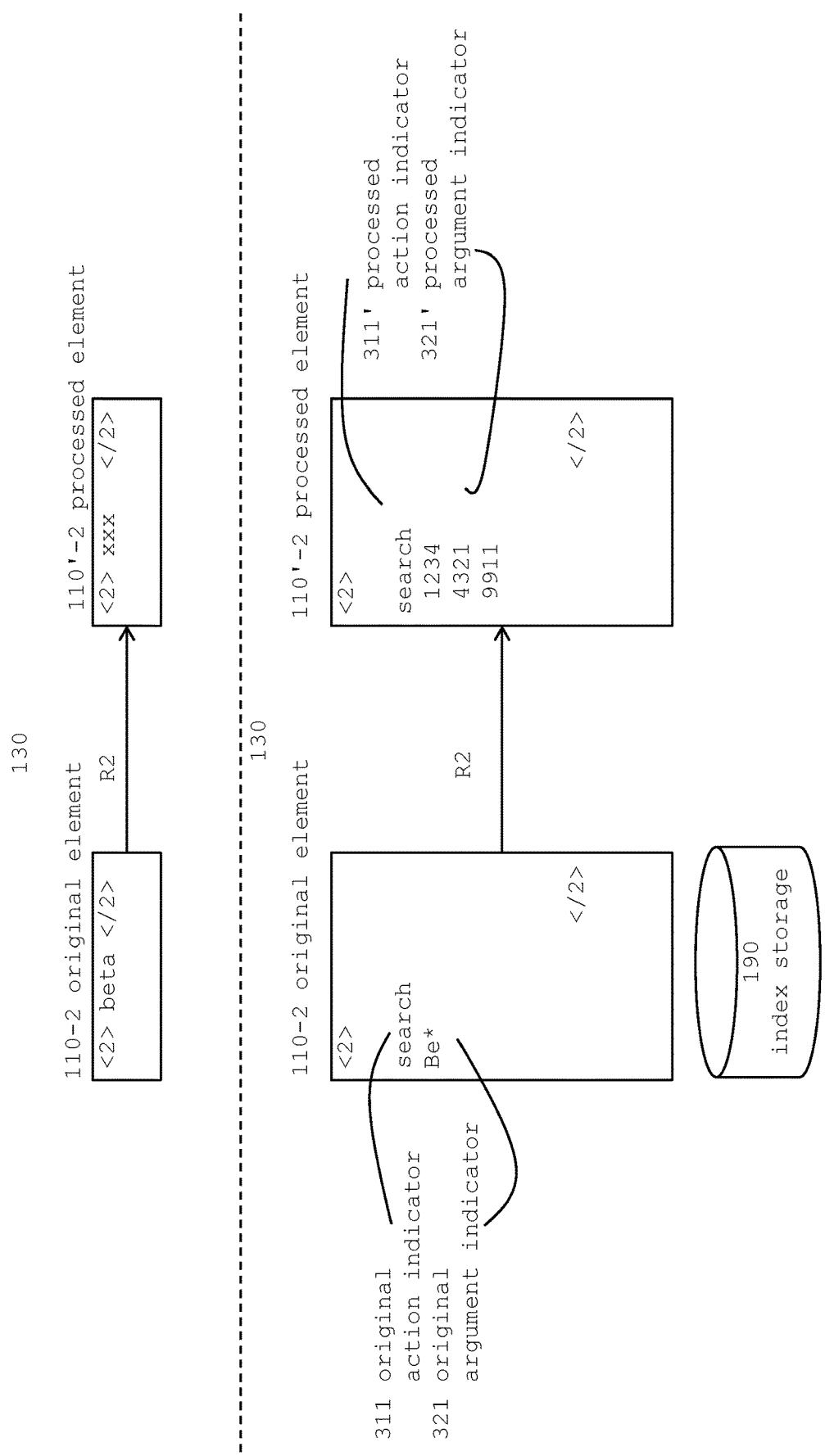
FIG. 3 illustrates an element that is being processed by the engine, with an overview granularity and with a detailed granularity that comprises an action indicator and an argument indicator.

FIG. 3 illustrates original element 110-2 that is being processed by engine 130 to processed element 110'-2. The figure uses an overview granularity (illustrated above a horizontal dashed line) and a detailed, feature-added granularity (below that line).

While in the example of FIGS. 2A and 2B, the engine (according to rule R2) would have processed the content "beta" of 110-2 to "xxx", for example by encryption, the example of FIG. 3 looks at a granularity with further features.

In the detailed granularity, FIG. 3 differentiates action indicator 311/311' and argument indicator 321/321'. Action and argument define activities to be performed by target computer 102-T/101-T once when it receives the (modified) data package. More in detail, the action is a control command that lets the target computer select a particular processing step, such as storing data, performing calculations, query a database etc. The argument indicates that particular data that is to be stored, used in calculation, to be queried etc.

As used herein, the term "indicator" stands for data that represents data to be processed. Indicators can be pointers or references (indirect indicators), or indicators can also be identical with the data to be processed (direct indicators). As used herein, the term "indicator" is applicable to represent an action (cf. action indicators 311 and 311') and is applicable to represent an argument (cf. argument indicators 312 and 312'). For example, the element "add 1, 2" has in action indicator ("add", to cause an addition, and has indicators for that are identical with the arguments (1, 2). For example, "add ### a, ### b" has an action indicator ("add") and has indicators that refer (or point) to the argument (here, the argument is a number that the processing computer can retrieve from a storage location ###, using variables "a" and "b"). It is noted that action indicators can also be referential indicators. For example, for element "#.#.#1,2", the processing computer would look up the action (e.g., add, multiply or other) from storage location #.#.# and would take the arguments directly.

However, there can be constraints. From a security perspective, the action indicator is potentially of no value to an attacker (or interceptor with malicious intent): computer with database applications do store, calculate, query etc. all the time, but the arguments have value indeed (cf. the discussion above). In other words and simplified: the action indicator can be non-sensitive, but the argument indicator is sensitive. From a scalability perspective, the quantity of actions/arguments could delay processing (i.e., operating the application computer 102 and returning results to computer(s) 101, including encrypting/decrypting). Both perspectives in combination reveal a conflict.

Separating action indicator 311/311' from argument indicator 321/321' can address that conflict. There is a further difference between original indicators (i.e. original action indicator 311, original argument indicator 321) and processed indicators (processed action indicator 311', processed argument indicator 321').

In the example, original action indicator 311 indicates an action (here a query coded with "search") to be performed by the target computer. Action indicator 311 remains unchanged (original=processed 311'), but the argument is changed (original argument not equal to processed argument). In case of attacks (malicious interceptions, eavesdropping etc.) to the data communication, criticality is different. The action indicator (e.g., "store", "calculate", here: "search") is substantially of no value for the attackers, the argument indicator (e.g., a particular name of a person) would be of value for them. But due to the security measures applied by element processing, the argument is hidden.

In the example, the argument is processed by the indexing approach that not only enhances security, but also enhances scalability in synergy.

Supposing the user of computer 101 needs to identify persons with the family name starting with "Be". Computer 101 interacts with the user and provides a data package in that element 110-2 comprises the query command "search Be*" with "search" being original action indicator 311 and "Be*" being original argument indicator 321. The query command is directed to the database of computer 102.

Rule R2 triggers the engine to interact with an index that is stored and that is available to the engine. The index can be stored in index storage 190 (for example, a database accessible to gateway 105) or otherwise. The database identifies the location of particular data (i.e., the "Be*" named persons, like "Beck", "Beier", "Beilmann" etc.) on computer 102 (target). In that sense, index storage 190 is an "index database". Queries to the database (by the engine) return a "database index" (or equivalent identification) in database of computer 102. In the example of FIG. 3, the index is given by the integers "1234, 4321, 9911" that become the processed argument indicator 321'. It is noted that the engine can add further information. For example, meta-data (in modified data package 110' or in processed element 110'-2) can indicate that indicator 321' comprises an index (and not the original search string).

As a result, computer 102 can perform the retrieval potentially faster (by accessing data through the index, scalability perspective) and can perform the retrieval with enhanced security because attackers would not see that the query is for "Be*".

In other words, there is no transmission of the original argument to the target. Instead, the engine points to the argument, for example, with a key to a data table, or an index for the database of computer 102. It may be advantageous that data package does not carry all entries in plain format. The risk of interception etc. is reduced.

Usage Scenario

FIGS. 4A and 4B illustrate a simplified usage scenario with exemplary activities of computer 101, engine 130 (part of gateway 105), and computer 102. In the example, computer 101 should run a browser application (client) and computer 102 should run a database application (server). As illustrated, the time progresses in top-down direction. The activities of computers 101 and 102 are illustrated by vertical lines and horizontal arrows. Arrows that leave a vertical line indicate "sending". Arrows that reach a vertical line indicate "receiving". The text at the arrows indicates the content of data packages, with instructions in UPPERCASE letters (such as "STORE", "IDENTIFY" etc.) and with results or other data (such as "sum=20.000"). Text in parenthesis ( ) gives comments that are optionally transmitted (e.g., "(return result)". The activities of engine 130 are controlled by the rules of rules templates 140-4A/4B. The rules R1, R2, R3, R4 are illustrated within boxes.

As explained earlier, the rules in the template correspond to the data-structure, but in this scenario, the rules are also defined for a sequence (here in the order R1 to R4).

As illustrated by FIG. 4A, the usage scenario has two steps. The two steps can be related to two different users. In step (1), a first user enters data into computer 101. In step (2), a second user instructs computer 101 to provide a calculation based on that data (cf. "many to one"). Computer 101 can be physically different between steps (1) and (2), but for simplicity, a single computer is being assumed. The "first user" can be considered as a group of users who enter data at different point in time, even from different computers 101. The first and second users are roles, wherein both users could be the same human person.

In step (1), computer 101 sends one or more data packages to computer 102 to store numeric values (integers such as 500, 1000, . . . , 2000) that are associated with entities (letters, A, B, Z). For example, the numeric values can represent physical quantities (such as weights in kilogram or other units, or counters), and the letters represent physical things (such as products). In an alternative understanding, the numeric values represent monetary amounts (such as salaries in a company), and the letters represent (human) persons of that company. In this example, the numeric values are examples for argument indicators that are identical with the argument.

In step (2), computer 101 sends a data package with an instruction (to computer 102) to calculate the sum of the numeric values, for the associated entities. The calculation is performed and the result is returned to computer 101.

In the example, there is a constraint in security and—at least to some extent—in scalability. It is assumed that the numeric values need to be protected from non-authorized access, so that storing them is allowed in encrypted form only. In other words, the numeric values, alone and in combination (or sum) are considered critical (in terms of security). Since decrypting is a computer activity that the second user (step (2)) potentially feels as waiting time, the security measures need to be adapted accordingly.

The goal is accomplished by engine 130, as follows: When in step (1), gateway 105 (i.e., engine 130) receives the (one or more) data packages with the instructions to store numeric values in association with entities ("store A= 2000" . . . "store Z=500"), engine 130 (cf. FIG. 1) applies a first rule R1 and keeps the action unmodified ("store") but encrypts the arguments (in the figure: "xxxx", "yyyy", "xyxy" etc.). Computer 102 receives (arrow symbols) the modified data packages and executes the (modified) instructions. As a consequence, the database application in computer 102 stores the encrypted values (e.g., "xxxx" instead of "2.000"). An attacker or interceptor would not benefit. When in step (2), gateway 105 receives a data package with the instruction "calculate A +B+Z", engine 130 applies a second rule R2 and separates the action ("CALCULATE+") from the arguments "A", "B", "Z"). For the arguments (only), the engines provides a (modified) data package with the instructions to retrieve "A", "B", "Z". Computer 102 provides the arguments (as stored, i.e., encrypted) and sends the arguments (in further data packages, here corresponding to packages 120, cf. FIG. 1) to gateway 105. In applying a third rule R3, the engine performs the decryption (reciprocal operation, e.g., from "xxxx" to "2.000"). In applying a forth rule R4, the engine performs the calculation (summing up the decrypted values) and returns the result to computer 101 (e.g., sum=20.000).

In other words, engine 130 has applied particular rules (according to the data-structure) and has performed some operations instead of computer 102. It is noted that the rules are used in combination. This can imply that the engine stores a record that a particular rule has been applied earlier.

Although FIGS. 4A and 4B illustrate the rules much simplified by keywords in natural language, the rules can be coded in a format that is standardized and that is adaptive to applications running in the computers. For example, if computer 102 performs an application, the rules can be provided in a language (with appropriate syntax) that is suitable to the application. Having the rules in a format that is applicable for both the gateway and the computers can reduce technical complexity. Business Process Execution Language (BPEL) is an example for such a format that can be used to describe the workflow to be executed by the engine.

As illustrated by FIG. 4B, the usage scenario can be enhanced. Template 140-4B has a different rule set (cf. R2' and R4'). In the example, step (1) in FIG. 4B corresponds to that step (1) of FIG. 4A. In the example of FIG. 4B, step (2) uses an additional instruction to identify the number of numeric values that are associated with A to Z ("value number"). The number is understood as count or quantity. For simplicity of explanation, it is assumed that during step (1), numeric values have been associated with entities A, B, C, R, S, T, X, Y, Z only. The value number is 9.

In the example of FIG. 4B, there is a complexity/scalability constraint. Re-directing the calculation of the value number for performance by the engine is possible in principle, but would require a further definition of rules etc. While this value number is not critical (e.g., the number of persons in the company is publicly available, at least in approximation), there is no need to protect that calculation (by encryption or otherwise).

The engine applies the rules with minor modifications. Rule R2' lets the "identify number" command pass without modifications. Computer 102 applies the instructions (by actually calculating the value number to be "9"). Rule R4' allows forwarding the result unmodified.

Operation Phases

Figure 5:
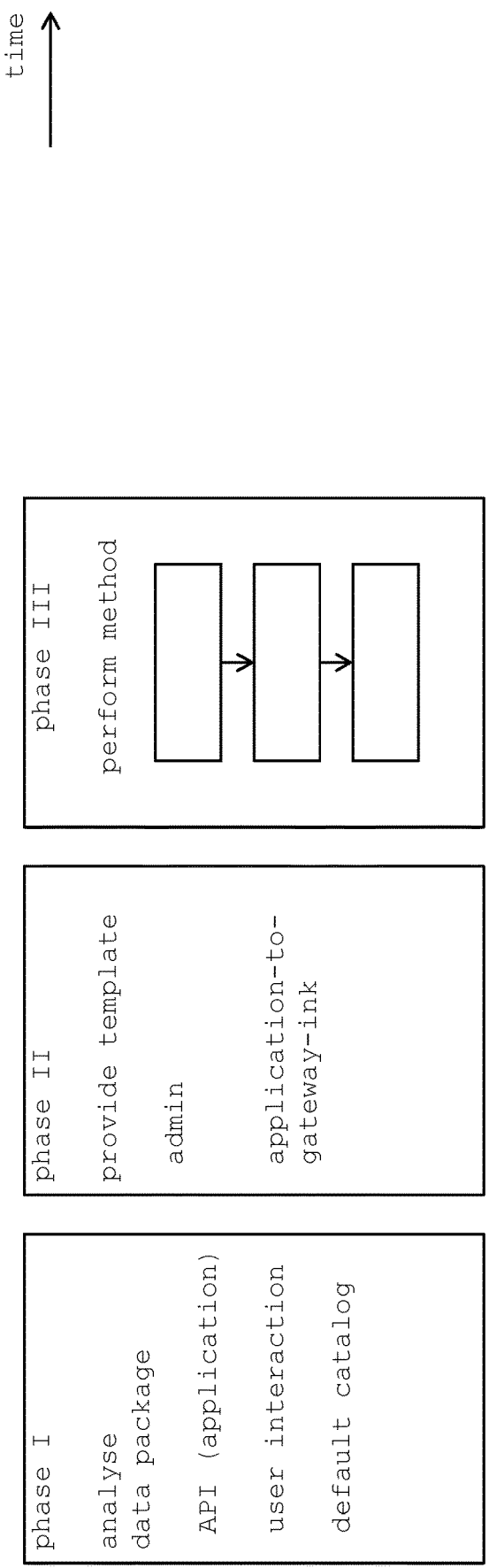
FIG. 5 illustrates an overview to different phases, with analysing, providing a rule template, and a performing a method that uses the rule template.

FIG. 5 illustrates an overview to different operation phases, with analyzing, providing a rule template, and performing a method that uses the rule template. The time is progressing from left to right.

Phases I and II are performed with computers that can be different from computers 101, 102 of FIG. 1. Phase III correspond to the execution of a method by gateway 105 (details as explained by example, flowchart in FIGS. 6A, 6B). Phases can be repeated, at least partially.

In phase I, a computer analyses original data packages (e.g., 110, 120). The computer can interact with a human user (who would have knowledge of the data-structures by that the packages are defined). The computer may interact with the source and/or target computers (via application program interfaces API, or otherwise) to identify the structures. In the above illustrated examples, the user would identify, for example, data elements 110-2 and 110-4 to be sensitive in need for encryption. Default catalogues with meta-rules can assist here. Such meta-rules can indicate preferences to use encryption (i.e. cipher-format) for content such as names of persons, quantitative values that are associated with persons (e.g., salary values), and others.

In phase II, the computer provides the rules (in form of templates) to the gateway. This can be performed through an administrator role of a gateway user. It is also possible to use the data-connection (application-to-gateway-link, API to/from computer 102) explained by line 108 in FIG. 1. It is contemplated that the operator of computer 102 becomes responsible for providing and updating the rule. The separation of engine 130 and rule templates 140 is advantageous in this respect. The operator (of 102) provides the rules (in the templates), but the engines do not provide the rule. The engine remains under control of the gateway operator. There can be various technical approaches to support that control. First, it is possible to provide rules without executable code (i.e. code that eventually could be performed by the gateway computer without the engine). Second, if rules are provided to comprise executable code, the code can be provided in combination with further security measures. For example, the code can be signed ("code signature") so that the authenticity of the code can be related to the gateway operator. Looking at the granularity, the signatures can be related to particular templates and/or to particular rules with the templates. Non-signed templates/rules would be blocked so that the engine can not execute them.

In phase III, gateway 105 (cf. FIG. 1) performs a computer-implemented method for communicating data between computer systems, to be explained with further detail just below.

The person of skill in the art understands that a temporal division of activities in phases I, II, and III is convenient for explanation, but that activities are not limited to particular phases. Once performed initially, phases I and II continue to be performed rather in parallel to phase III. The separation of engine and template allows updating rule without the need to interrupt the operation of the engine. From a different perspective: there is a technical problem (updating can cause an interruption) and the technical solution (the separation). The engine can periodically query new rules; and rule updates can trigger the engine to apply the updated rules immediately (i.e. once the update becomes available to the engine).

Method

FIGS. 6A and 6B illustrate a method flow chart of computer-implemented method 600 for communicating data between computer systems. FIG. 6A gives an overview, and FIG. 6B explains details for sub-steps (that are part of the step "process elements")

Method 600 relates to communicating data (cf. packages 110, 110', 120, 120') between computer systems (cf. systems 101, 102 in FIG. 1) in the functions of a source computer system and of a target computer system. Method 600 is performed by data modification engine 130 in gateway computer 105 that is communicatively connected between the computer systems.

In receiving step 610, the engine receives an original data package (e.g., package 110) from the source computer system. The original data package 110 has a plurality of elements (e.g., N elements) that are arranged according to a pre-defined data-structure (cf. the explanation of examples, in connection with FIGS. 2A and 2B). In accessing step 620, the engine accesses a rule template that corresponds to the data-structure (i.e., a template that is associated with the data-structure) and that provides a plurality of pre-defined rules. In separating step 630, the engine separates the original data package into the plurality of elements according to the data-structure (cf. FIGS. 2A, 2B on the left side with separator component 131). In processing step 640, the engine processes at least some of the elements by digitally transforming the elements according to the plurality of rules. This processing results in the processed elements (cf. FIGS. 2A, 2B on the right side). In combining step 650, the engine combines the processed elements to a modified data package (cf. FIG. 2A, 2B, for example, by combiner component 132). The engine combines according to the data-structure. In sending step 660, the engine sends the modified data package to the target computer system.

More in detail, the engine can perform processing step 640 by processing at least a sub-set of the plurality of elements (e.g., with a sub-set of rules 2, 4 being a subset to rules 1, 2, 3, 4). As explained, processing follows the rules. The rules are selected from the group of the following: (i) rules for encrypting and rules for decrypting (the decrypting rules correspond to the encrypting rule in the sense to reverse the encryption)—such rules mainly address the security requirements.

(ii) rules for encoding elements with specific character sets (with corresponding rules for decoding)—such rules mainly address the scalability requirements.

(iii) rules for changing identifiers from data elements, as explained in the examples for tokenization, introducing pseudonyms—such rules mainly address the security requirements.

(iv) rules for arranging content in a particular order, as explained above in the examples for convolutional interleaving—such rules can address security, the reduction of data transmission errors between the computers and other requirements or constraints.

(v) rules for normalizing content and (vi) rules for converting communication protocols, as explained in the protocol example—such rules mainly address scalability and security.

Optionally, the engine can apply processing step 640 according to encrypting rules (or according to decrypting rules) that are applied to all elements of the original data package.

Optionally, the engine can perform processing step 640, by the following: the engine applies at least a sub-set of the rules to particular original elements by differentiating an original action indicator and an original argument indicator. The original action indicator indicates an action to be performed by the target computer system, cf. the example of FIGS. 3, 4A, 4B with indicators 311 and 312 and with actions such as "store" (in a database at the target) and "calculate". In such a scenario, the engine processes the original argument indicator (321/322, but keeps the action indicator unchanged). Optionally, in applying processing step 640, the engine looks up the original argument indicator in an index storage (e.g., index database) that is available to the engine and that provides the modified argument indicator as an index. This approach allows the computer in the target function to access data that corresponds to the argument indicator. Optionally, in applying processing step 640, the engine can modify the original argument indicator by encrypting, or can modify the argument indicator by decrypting.

Selecting the Computers to Perform Actions

The approach with the templates (and the rules) allows identifying particular computers that perform the actions (that are indicated by the data packages, as explained in the examples as action indicator 311, argument indicator 312). Looking at above outlined requirements and constraints (security, scalability, adaptability etc.), some of the actions can not be performed by the target computer. In the example of FIGS. 3, 4A, 4B, mainly the security requirement has been addressed by shifting the performance of the action partly to the gateway. Performing some of the actions by the gateway can also address the other requirements, such as scalability, adaptability. For example, the first computer may consecutively send a plurality of packages to the second computer, via the gateway. The gateway may be able to process the majority (or a larger share) of the packages, but not be able to process a minority (of smaller share) of the packages, due to complexity of the action instructions, or for other reasons. In such cases, the processing resources can be shifted, from the second computer to the gateway, at least partially. The gateway—in performing actions—reduces the computational load of the second computer. If for performance reasons, the gateway becomes unable to perform the actions, the gateway simply forwards the packages to let the second computer perform the action.

Identifying particular computers that perform the action comprises an evaluation step by that the engine—based on the rule—determines the availability of the second computer (i.e., the target) to perform the action, and/or to determine the availability of the second computer (i.e., the target) to perform the action. The description explains the first alternative in combination with FIG. 6B and explains the second alternative thereafter.

FIG. 6B illustrates details for optional implementations of the processing step 640 (first alternative for identifying a computer). Similar to the approach of FIGS. 4A and 4B, in performing processing step 640, the data modification engine—in using instructions from the rule template—performs the following:

In an evaluating step 641, the engine evaluates original action indicator 311 in combination with original argument indicator 312 to determine availability or non-availability of target computer 102-T/101-T to perform a particular action that is indicated in the original action indicator 311. In the example of FIGS. 4A and 4B, the particular action was to perform a calculation (cf. step (2) CALCULATE), with querying/retrieving data and with performing the calculation by summing up the retrieved data. It is noted that the determination is ruled-specified and relates to the action, not to the argument. The determination can be based on several triggers like timing triggers or protocol triggers.

There are two cases to differentiate. The target computer is available or not available.

In case of non-availability, the engine performs receiving 642 an alternative argument that corresponds to the original argument indicator (311). The engine receives the argument by interacting with the target computer or by interacting with index storage 190 (e.g., the database that is accessible to the engine). The engine performs the particular action itself.

In the example of FIGS. 4A and 4B, the alternative argument results from retrieving A=xxxx, B=yyyy etc. (and the meta-data showing that the data has been encrypted). The engine decrypts the data and calculates the sum, as explained above.

In the example of FIG. 3, the alternative argument results from retrieving the index (that was previously stored and made available to the engine, for example from index storage 190).

In case of availability, the engine performs forwarding 643 the original action indicator 311 and the original argument indication 312 to the target computer.

Looking at the second alternative for identifying a computer, the engine can evaluate the original action indicator 311 in combination with original argument indicator 312 to determine availability or non-availability of gateway computer 105 to perform a particular action that is indicated in the original action indicator 311. In case of availability, the engine of the gateway performs the action that is indicated by original action indicator 311 and with the original argument indicator 312. In case of non-availability, the engine forwards original action indicator 311 and original argument indicator 312 to the target computer.

Method and Usage Scenario

Referring to the phases that are discussed in connection with FIG. 5, method 600 (with or without it optional steps) can also be considered as having further steps. However, these steps are not necessarily performed by the engine. These steps can be selected from the group of the following steps:

There can be a monitoring step to monitor the communication between the source computer and the target computer.

There can be an evaluating step to evaluate error messages from the target computer. The error messages indicate that the modified data package (being sent in step 660) can not be processed by the target computer system. Such an error message can also contribute to the determination of availability/non-availability in step 641.

Figure 6C:
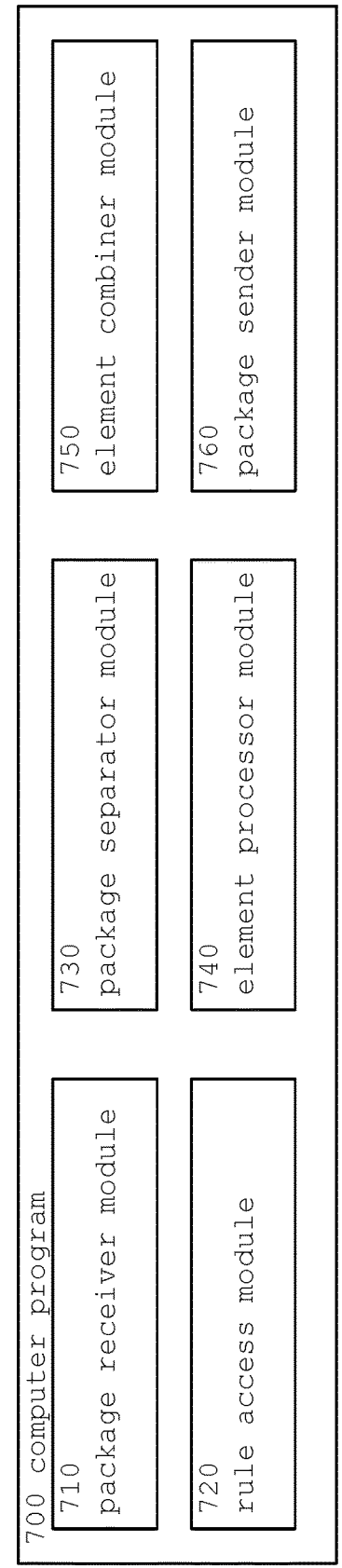
FIG. 6C illustrates an example computer program to implement the computer-implemented method for communicating data between computer systems of FIGS. 6A and 6B.

There can be an update receiving step. Via application program interfaces (API), the gateway computer can receives updates to the rule templates, from computer systems that are associated with the target computer systems Computer Program FIG. 6C illustrates a computer program and a computer program product. The computer program product—when loaded into a memory of a computer and being executed by at least one processor of the computer—performs the steps of the computer-implemented method. So in other words, the blocks in FIGS. 6A and 6B illustrate the method executed by gateway computer 105 that can be implemented by the (gateway) computer under the control of the program. FIG. 6C shows the modules of the computer program (product) 700 in correspondence to FIG. 6A with package receiver module 710, rule access module 720, package separator module 730, element processor module 740, element combiner module 750, and package sender module 760. References 6x0 in FIG. 6A correspond to references 7x0 in FIG. 6C.

Multiple Gateways

As explained above in connection with FIG. 1, gateway 105 (engine 130) can be divided into multiple parts and can be located on several information technology systems (IT systems). Usage scenarios are possible in that multiple computers are distributed globally. Groups of one or more computers (targets) can be located in different geographic regions. The regions can have different granularities. The globe can be divided into global regions (for example with one group of computers in Europe, one group in Asia, one group in North America and so on), or into more local regions (for example, with one or more groups at a first location in Germany, a second location in France and so on). One or more gateways can be assigned to the one or more computers in each group. Also, gateways can be provided in redundancy so that the number of gateways for a group is eventually higher than the number of computers in a group.

State-Less Communication

The one or more gateways can communicate the data (between source and target) in a stateless approach without retaining information. Auxiliary information that supports the communication, such as configuration settings, rules templates, keys for encryption and decryption, indices (cf. index database(s)) etc., can be made available to the gateways in relational databases. Synchronizing databases is well known in the art. Such an approach supports geographic redundancy (or "geo-redundancy"), depending on the granularity of the regions. Geo-redundancy for the mentioned auxiliary information becomes available across continents, across different countries and so on.

In other words, the method (cf. FIG. 6A) can be performed by one or more further data modification engines in one or more further gateway computers that are communicatively connected between further computer systems. In such scenarios, the rule templates are synchronized through a central database (for example the mentioned relational database) that is accessible to gateway computer 105 and to the (one or more) further gateway computers.

Deployment

Regarding the deployment of gateway, the person of skill in the art can provide the gateways as virtual computers, for example by using virtualization at the level of operating the system (containerization).

Further Considerations—Computer Groups

Figure 7:
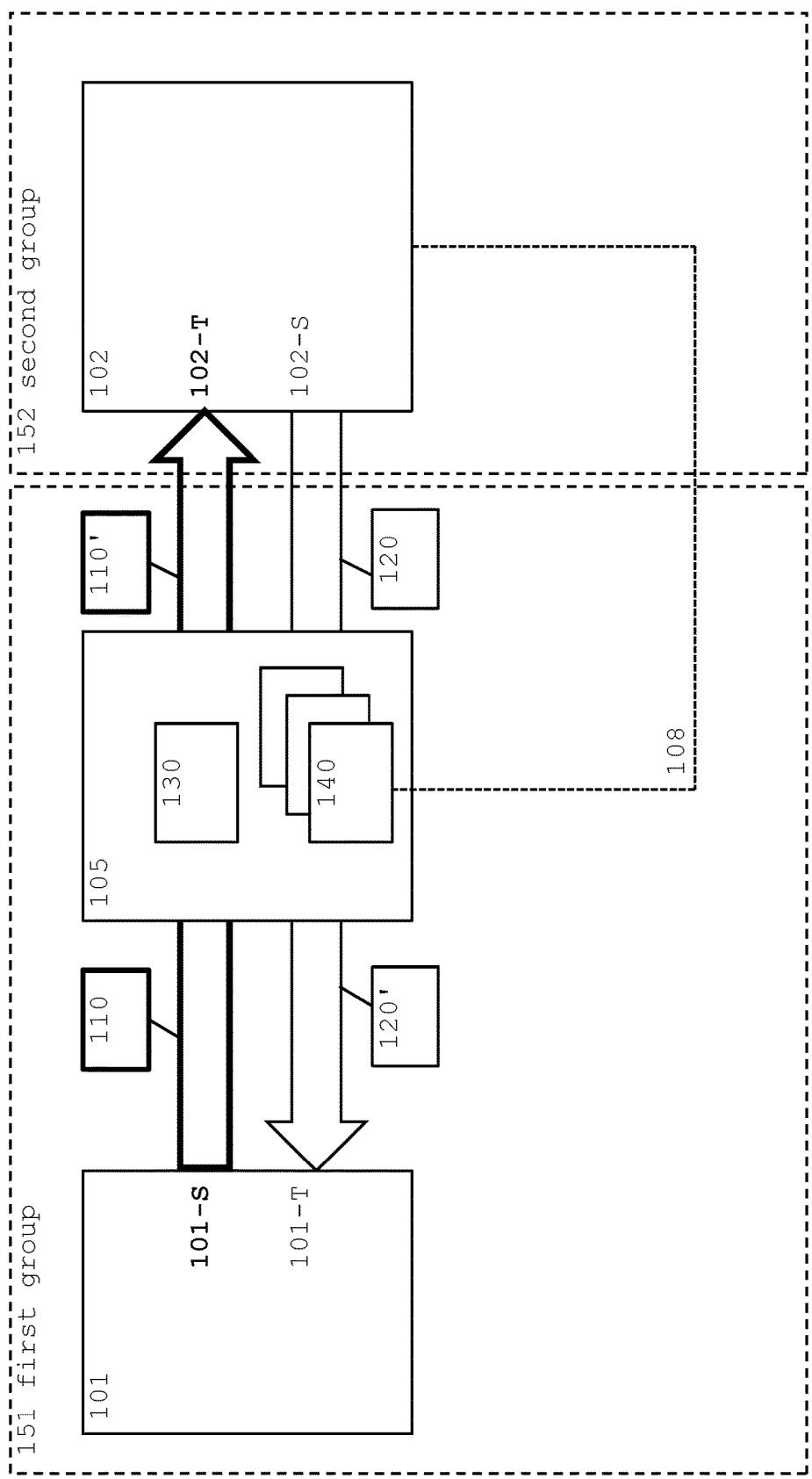
FIG. 7 illustrates the computer system of FIG. 1, with the first computer and second computer communicating via the gateway computer, in the context of having the first computer and the gateway in a first group of computers, and having the second computer in a second group of computers, wherein the group of computers have different data access-restrictions in place.

FIG. 7 illustrates the computer system of FIG. 1, with first computer 101-S/101-T and second computer 102-S/102-T communicating via gateway computer 105, in the context of having the computer and the gateway in first group 151 (of computers), and having the second computer in second group 152 (of computers), wherein the groups of computers 151, 152 have different data access-restrictions in place.

In general, data processing at the destination computer (i.e., in the present notation being the computer in the target function 101-T/102-T) can be associated with risks, among them the following: (i) data arriving at the destination computer can cause malfunction of a technical system (in that the target computer is part thereof); (ii) data arriving at the destination computer can cause activities that are not desired for other reasons; and (iii) the transfer or transport via uncontrollable networks can cause risks, such as risks regarding data integrity or data privacy.

Data can therefore be categorized, into risk data (such as malfunction-risk data, and activity-risk data) and no-risk data. (The above description has discussed risks in different terminology, for example in view of security constraints, etc.).

The classification can be implemented by the above-discussed rules (e.g., rule R2 in FIGS. 2A, 2B, FIG. 3). Simplified, and in terms of the above-discussed example with the attacker, risk data has value to the attacker, but non-risk data does not.

A particular original data package 110 can therefore comprise data of both categories, but the classification (and separation during processing, step 630) is not limited at the granularity of elements 110-*n* (cf. FIGS. 2A and 2B), but also at the granularity of one element (e.g., FIG. 3, element 2).

As explained, separating arguments from actions can be advantageous in reducing risks. Usually, the arguments are associated with risks, and the actions are not associated with the risks. (The look at the example of FIGS. 4A, 4B: the A, B, C etc. salary values are risk data, the identification of the action CALCULATE is not a risk.)

The risk classification (at both granularities, a) between the elements of data packet, cf. FIGS. 2A and 2B, and b) between action and arguments of a single element, cf. FIG. 3), can be taken over into the differentiation of computer groups, depending on particular risks. According to the classification, the computers (i.e., the source computer, the target computer, and the gateway computer) can be allocated to computer groups with different, but appropriate risk-reducing measures.

The measures can comprise access restrictions that are implemented by known approaches, such as pre-defined data-access restrictions (implemented with firewalls or otherwise). In the example of FIG. 7, source computer 101-S and gateway computer 105 can belong to first group 151 (or first access zone), and target computer 102-T belongs to second group 152 (or second access zone). The computers in the first group would be access-protected by a firewall (or other measure) that is common to all computers in the group. It is noted that such configurations can frequently be found in organizations. Data leaving the organization would be processed by a computer (i.e. the target computer) that has access-protection different from that of the first group (or organization internal group). Data would have to leave the first group to be processed. In that sense, the processing engine provides group-leaving restrictions: risk data becomes no-risk data. The target computer would provide a Software-as-a-Service application, but would only process no-risk data (cf. FIG. 4B for the example).

To reduce the risk, the data is being processed (by the gateway computer) before leaving the first group. In other words, while the data transmitted from the source computer to the gateway computer is risk data, the data further transmitted from the gateway computer to the target computer is no-risk data.

The action (such as storing or calculating) can still be performed by the target computer, but the target computer will obtain the arguments (i.e., the data to be stored, or the numeric values to the calculated) from a different storage location (e.g., identified by the index), the different storage location can be part of the first group.

The data that is leaving gateway 105 and hence leaving first group 151 would be the index (no-risk). For the mentioned attacker, the index alone has no value; the index in combination with the action has no value either.

Flexibility in defining the groups is related to the flexibility of the rule sets. The presence (or absence) of a particular computer in a particular group can be rule-defined according to the risk. In other words, the access-restrictions for the computer groups can be adapted to the selection of rules that separate risk data from no-risk data. Since the rules are flexible in being modified via the templates, the adaptations can be flexible as well.

Generic Computer Device

Figure 8:
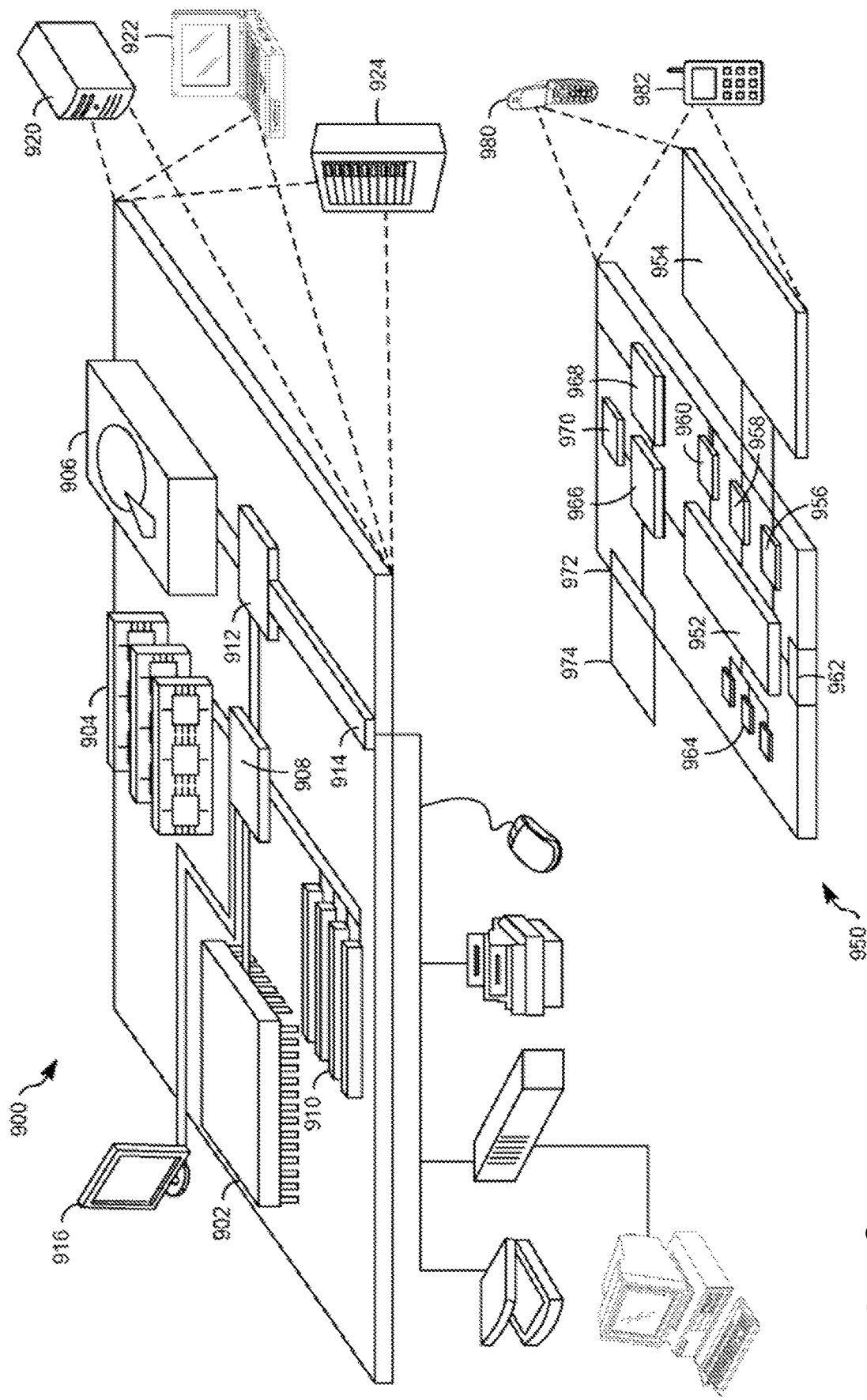
FIG. 8 illustrates a generic computer.

FIG. 8 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers.

Generic computing device 900 may correspond to the computer system explained above. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

REFERENCES

101 first computer system
102 second computer system
105 gateway computer
108 rule-provisioning function
110 original data package
110' modified data package
110-$n$ element in a data package
120 data package
120' modified data package
130 data modification engine
131 separator component
132 combiner component
140 rule template(s)
151 first group of computers
152 second group of computers
190 index storage
311 original action indicator
311' processed action indicator
321 original argument indicator
321' processed argument indicator
6$xx$ method steps
7$x$0 computer program
9$xx$ generic computer with its components
R, Rn rules
-S computer acting as source
-T computer acting as target

What is claimed is:

1. A computer-implemented method for communicating data between computer systems in the functions of a source computer system and of a target computer system, the method being performed by a data modification engine in a gateway computer that is communicatively connected between the computer systems, the method comprising:
receiving an original data package from the source computer system, the original data package having a plurality of elements that are arranged according to a pre-defined data-structure,
accessing a rule template that is associated with the pre-defined data structure and that provides a plurality of pre-defined rules;

separating the original data package into the plurality of elements according to the pre-defined data-structure;

processing the elements by digitally transforming at least some of the elements according to the plurality of pre-defined rules to processed elements, wherein the data modification engine:

applies at least a sub-set of the pre-defined rules to particular original elements having indicators that represents data to be processed, differentiates an original action indicator and an original argument indicator, with the original action indicator indicating an action to be performed by the target computer system, evaluates the original action indicator in combination with the original argument indicator to determine availability or non-availability of the target computer system to perform the action that is indicated in the original action indicator, in case of non-availability, receive an alternative argument that corresponds to the original argument indicator by interacting with the target computer system or by interacting with an index storage that is accessible to the data modification engine and perform the action by the data modification engine;

combining the processed elements according to the pre-defined data-structure to a modified data package; and sending the modified data package to the target computer system.

2. The method according to claim 1, wherein processing the plurality of elements comprises processing a sub-set of the plurality of elements according to pre-defined rules of the rule template wherein the pre-defined rules are selected from the group of the following: rules for encrypting, corresponding rules for decrypting; rules for encoding elements with specific character sets, corresponding rules for decoding; rules for changing identifiers from data elements; rules for arranging content in a particular order; rules for normalizing content; and rules for converting communication protocols.

3. The method according to claim 2, wherein processing according to encrypting rules or according to decrypting rules is applied to all of the plurality of elements of the original data package.

4. The method according to claim 1, wherein in the processing step, the data modification engine processes the original argument indicator to a processed argument indicator.

5. The method according to claim 1, wherein the modified data package includes a modified argument indicator and wherein in applying the processing step, the data modification engine looks up the original argument indicator in the index storage that is available to the data modification engine and provides the modified argument indicator as an index that allows the target computer system to access data that corresponds to the original argument indicator.

6. The method according to claim 1, wherein in applying the processing step, the data modification engine modifies the original argument indicator by encrypting, or modifies the original argument indicator by decrypting.

7. The method according to claim 1, wherein in case of availability, forwarding the original action indicator and the original argument indicator to the target computer system.

8. The method according to claim 1, wherein in performing the processing step, the data modification engine, in using instructions from the rule template, performs the following:

evaluating the original action indicator in combination with the original argument indicator to determine availability or non-availability of the gateway computer to perform the action that is indicated in the original action indicator, in case of availability, performing the action that is indicated by the original action indicator and the original argument indicator by the gateway computer, in case of non-availability, forwarding the original action indicator and the original argument indicator to the target computer system.

9. The method according to claim 1, being performed by one or more further data modification engines in one or more further gateway computers that are communicatively connected between further computer systems, wherein rule templates are synchronized through a central database that is accessible to the gateway computer and to the one or more further gateway computers.

10. The method according to claim 1, further comprising steps, selected from the group of:

monitoring communication between the source computer system and the target computer system;

evaluating error messages from the target computer system, the error messages indicating that the modified data package being sent can not be processed by the target computer system; and via application program interfaces, receiving updates to the rule template from computer systems that are associated with the target computer system.

11. The method according to claim 1, wherein receiving the original data package is performed by receiving the original data package from a source computer system that, together with the gateway computer, belongs to a first group of computers in that access-restrictions are common to the computers of the first group of computers, and wherein sending the modified data package is performed by sending the modified data package to the target computer system that belongs to a second group of computers, wherein the access-restrictions are different for both groups of computers.

12. The method according to claim 11, wherein the rule template causes the processing elements step to be performed in correspondence with the access-restrictions of the first group of computers so that the modified data package does not comprise data that is restricted to the computers of the first group.

13. A computer program product for communicating data between computer systems, the computer program product being tangibly embodied on a non-transitory computer-readable storage medium on a computer, wherein the computer is a data modification engine in a gateway computer that is communicatively connected between computer systems in the functions of a source computer system and of a target computer system, and comprising instructions that, when executed by the computer, are configured to cause the computer to:

receive an original data package from the source computer system, the original data package having a plurality of elements that are arranged according to a pre-defined data-structure, access a rule template that is associated with the pre-defined data structure and that provides a plurality of pre-defined rules;

separate the original data package into the plurality of elements according to the pre-defined data-structure;

process the plurality of elements by digitally transforming at least some of the plurality of elements according to the plurality of pre-defined rules to processed elements, wherein the data modification engine:
  applies at least a sub-set of the pre-defined rules to particular original elements having indicators that represents data to be processed,
  differentiates an original action indicator and an original argument indicator, with the original action indicator indicating an action to be performed by the target computer system,
  evaluates the original action indicator in combination with the original argument indicator to determine availability or non-availability of the target computer system to perform the action that is indicated in the original action indicator,
  in case of non-availability, receive an alternative argument that corresponds to the original argument indicator by interacting with the target computer system or by interacting with an index storage that is accessible to the data modification engine and perform the action by the data modification engine;
  combine the processed elements according to the pre-defined data-structure to a modified data package; and
  send the modified data package to the target computer system.

14. The computer program product according to claim 13, wherein the instructions that cause the computer to process the plurality of elements include instructions that, when executed by the computer, causes the computer to let the data modification engine process the original argument indicator to a processed argument indicator.

15. The computer program product according to claim 13, wherein the modified data package includes a modified argument indicator and wherein the instructions that cause the computer to process the plurality of elements include instructions that, when executed by the computer, cause the computer to look up the original argument indicator in the index storage that is available to the data modification engine and provide the modified argument indicator as an index that allows the target computer system to access data that corresponds to the original argument indicator.

16. The computer program product according to claim 13, wherein the instructions that cause the computer to process the elements include instructions that, when executed by the computer, cause the computer to use instructions from the rule template and perform the following:
  in case of availability, forward the original action indicator and the original argument indicator to the target computer system.

17. The computer program product according to claim 13, wherein the instructions that cause the computer to process the plurality of elements include instructions that, when executed by the computer, cause the computer to use instructions from the rule template and perform the following:
  evaluate the original action indicator in combination with the original argument indicator to determine availability or non-availability of the gateway computer to perform the action that is indicated in the original action indicator,
  in case of availability, perform the action that is indicated by the original action indicator and the original argument indicator by the gateway computer, in case of non-availability, forwarding the original action indicator and the original argument indicator to the target computer system.

18. A gateway computer that is adapted to be communicatively connected between computer systems in the functions of a source computer system and of a target computer system, the gateway computer comprising a data modification engine that is adapted to communicate data by
  receiving an original data package from the source computer system, the original data package having a plurality of elements that are arranged according to a pre-defined data-structure,
  accessing a rule template that is associated with the pre-defined data structure and that provides a plurality of pre-defined rules;
  separating the original data package into the plurality of elements according to the pre-defined data-structure;
  processing the elements by digitally transforming at least some of the elements according to the plurality of pre-defined rules to processed elements, wherein the data modification engine:
    applies at least a sub-set of the pre-defined rules to particular original elements having indicators that represents data to be processed,
    differentiate an original action indicator and an original argument indicator, with the original action indicator indicating an action to be performed by the target computer system,
    evaluates the original action indicator in combination with the original argument indicator to determine availability or non-availability of the target computer system to perform the action that is indicated in the original action indicator,
    in case of non-availability, receive an alternative argument that corresponds to the original argument indicator by interacting with the target computer system or by interacting with an index storage that is accessible to the data modification engine and perform the action by the data modification engine;
  combining the processed elements according to the pre-defined data-structure to a modified data package; and
  sending the modified data package to the target computer system.

19. The gateway computer according to claim 18, wherein the data modification engine is adapted to process the original argument indicator to a processed argument indicator.

20. The gateway computer according to claim 18, wherein the modified data package includes a modified argument indicator and wherein the data modification engine is adapted to look up the original argument indicator in the index storage that is available to the data modification engine and provides the modified argument indicator as an index that allows the target computer system to access data that corresponds to the original argument indicator.

* * * * *